(12) United States Patent
Hastings (10) Patent No.: US 9,765,920 B2
(45) Date of Patent: Sep. 19, 2017

(54) POSITIONING APPARATUS AND SYSTEM FOR DIRECTING A BEAM

(75) Inventor: Stephen Hastings, Munich (DE)

(73) Assignee: abariscan GmbH (DE)

( * ) Notice: Subject to any disclaimer, the term of this patent is extended or adjusted under 35 U.S.C. 154(b) by 1036 days.

(21) Appl. No.: 13/162,715

(22) Filed: Jun. 17, 2011

(65) Prior Publication Data
US 2012/0320596 A1    Dec. 20, 2012

(51) Int. Cl.
*G02B 26/08*    (2006.01)
*G02B 26/10*    (2006.01)
(Continued)

(52) U.S. Cl.
CPC ......... *F16M 11/125* (2013.01); *F16M 11/121* (2013.01); *F16M 11/14* (2013.01); *G02B 26/101* (2013.01); *G02B 26/105* (2013.01)

(58) Field of Classification Search
CPC .. F16M 11/121; F16M 11/14; F16M 2200/08; F16M 11/125; F16M 2200/041; F16M 2200/048; G02B 26/101; G02B 26/105; G02B 26/0858; G02B 7/1821; G02B 26/0833; G02B 26/0841;
(Continued)

(56) References Cited

U.S. PATENT DOCUMENTS 5,959,758 A    9/1999 Seo
6,201,644 B1   3/2001 Sakata et al.
(Continued)

FOREIGN PATENT DOCUMENTS

CN    101563638       10/2009
EP      0 916 983      5/1999
WO   WO 2008/023272   2/2008

*Primary Examiner* — Scott J Sugarman
*Assistant Examiner* — Mustak Choudhury
(74) *Attorney, Agent, or Firm* — Pandiscio & Pandiscio (57) ABSTRACT

The present invention relates to an apparatus for positioning at least one optical element (22), wherein the apparatus (1) comprises at least one movable carrier (20) for holding the optical element (22), at least one fixed support portion (10) for supporting the carrier (20), connecting means for connecting the carrier and the support portion, and actuating means for creating forces to influence the relative position of the carrier (20) to the support portion (10). The apparatus (1) is characterized in that the connecting means comprise at least one retention device (32) for applying tension force between the carrier (20) and the support portion (10) and at least one bearing (31), wherein the bearing (31) comprises a first bearing magnet (311), wherein at least a part of the surface (3121) of the first bearing magnet (312) has the shape of a partial sphere and a second bearing magnet (312), wherein at least part of the surface (3111) of the second bearing magnet (311) has the shape of a partial hollow sphere for at least partially receiving the partial sphere surface (3121) of the first bearing magnet (312), wherein the first and second bearing magnets (311, 312) are permanent magnets and are arranged such that the opposing magnet poles of the first and second bearing magnet (311, 312) are facing each other. Also a system for directing a beam, in particular a laser beam, including at least one positioning apparatus is disclosed.

15 Claims, 6 Drawing Sheets

(51) Int. Cl.
*G02B 26/12* (2006.01)
*F16M 11/12* (2006.01)
*F16M 11/14* (2006.01)

(58) Field of Classification Search
CPC .... G02B 26/08; G02B 26/0816; G02B 21/24;
B81B 2203/01
USPC ............... 359/221.3, 196–202, 310, 318;
248/346.06; 369/44.22
See application file for complete search history.

(56) References Cited

U.S. PATENT DOCUMENTS

| | | |
|---|---|---|
| 7,388,700 B1 | 6/2008 | Odhner |
| 2002/0053849 A1 | 5/2002 | Corcoran |
| 2002/0181839 A1* | 12/2002 | Brown et al. ............. 385/16 |
| 2002/0181851 A1 | 12/2002 | Brown et al. |
| 2006/0001939 A1* | 1/2006 | Lee et al. ................ 359/216 |

* cited by examiner

POSITIONING APPARATUS AND SYSTEM FOR DIRECTING A BEAM

FIELD OF THE INVENTION

The present invention relates to a positioning apparatus for positioning an optic, in particular at least one optical element, and to a system for directing a beam, in particular a laser beam, using a positioning apparatus.

BACKGROUND OF THE INVENTION

In recent years the use of electromagnetic wave beams, such as laser beams, has been applied to various fields of technology. Besides scanning or marking of objects also machining of tools and medical treatment currently employ electromagnetic waves. Each of these applications requires accurate directing of the beam to a prescribed target. Directing of the beam is usually performed by deflecting devices which include one or more reflecting elements. One method for controlling the movement of the reflecting devices has been suggested in the prior art in US 2002/0181851 A1 which discloses an apparatus for controlled movement of an element. The apparatus comprises a movable member and a fixed member. The movable member includes a magnetic element and the fixed element comprises a magnetically permeable stator element. A magnetic traction force acts across the air gap between the magnetic element and the stator element and thereby urges the movable member towards the fixed member. Furthermore, stator current coils are wound onto portions of the stator. The electromagnetic force generated by current passing through the coils acts on the magnetic element to move the movable member in a controllable manner.

One disadvantage of this known apparatus is that considerable friction forces occur between the movable member and the fixed member. Hence the performance of the apparatus is not satisfactory.

The problem underlying the present invention is thus to provide an apparatus for positioning an optics, in particular at least one optical element, wherein the apparatus provides high performance.

SUMMARY OF THE INVENTION

The present invention is based on the finding that this problem can be solved by an apparatus, wherein the area of physical contact between a movable carrier and a fixed support portion is minimized.

According to a first aspect of the present invention, the problem is solved by an apparatus for positioning at least one optical element, wherein the apparatus comprises
  at least one movable carrier for holding the optical element,
  at least one fixed support portion for supporting the carrier,
  connecting means for connecting the carrier and the support portion and
  actuating means for creating forces to influence the relative position of the carrier to the support portion.
The apparatus is characterized in that the connecting means comprise
  at least one retention device for applying tension force between the carrier and the support portion and
  at least one bearing, wherein the bearing comprises
    a first bearing magnet, wherein at least a part of the surface of the first bearing magnet has the shape of a partial sphere, and
    a second bearing magnet, wherein at least part of the surface of the second bearing magnet has the shape of a partial hollow sphere for at least partially receiving the partial sphere surface of the first bearing magnet,
  wherein the first and second bearing magnets are permanent magnets and are arranged such that the opposing magnet poles of the first and second bearing magnet face each other.

The positioning apparatus of the present invention, which will also be referred to as the apparatus hereinafter, may also be referred to as a motor. The optical element according to the present invention may be part of an optic arrangement. In particular, the optical element may be a reflecting and/or diffractively deflecting element such as a mirror, a lens or the like. Positioning of the optical element according to the present invention comprises the rotation of the optical element about at least one, preferably at least two axes. In addition, a lateral movement of the optical element along a third axis may be comprised by the positioning of the optical element. The positioning of the optical element is preferably a temporary positioning. In particular, the position of the optical element may be held at a set position and/or changed by the apparatus. The position of the optical element is preferably the relative position of the optical element with respect to a beam, in particular a laser beam. Preferably, this position is defined by the angle of a surface of the optical element to the direction of the beam. In addition, the position may comprise the distance of the surface of the optical element towards the source of the beam, in particular a laser source, or a reflecting member from which the beam is reflected towards the optical element of the inventive apparatus.

According to the invention, the positioning apparatus comprises at least one movable carrier for holding the optical element, at least one fixed support portion for supporting the carrier, connecting means for connecting the carrier and the support portion and actuating means for creating forces to influence the relative position of the carrier to the support portion.

The movable carrier preferably has the shape of a plate, in particular a planar plate. The optical element may be attached onto or may be inserted into the carrier. In the latter case, a recess for receiving the optical element is preferably provided in one surface of the carrier. Also in this case, the optical element will preferably be attached, for example adhered, to the carrier. The carrier represents the movable or tilting part of the apparatus. In particular, the carrier may be tilted with respect to a fixed support portion of the apparatus. This tilting is a rotation about at least one axis, preferably about at least two or more axes, which may extend within the surface of the optical element in any direction intercepting a central single point of the optical element. A rotation about the axis which is perpendicular to the surface of the optical element is not intended by the positioning with the inventive positioning apparatus.

The fixed support that may also be referred to as a base of the apparatus may be of various shapes. In a preferred embodiment the support comprises a main body in the shape of a thick plate to which further elements of the support may be attached or formed onto. The support is fixed, which means that no movement of the support is caused by the components of the positioning apparatus. The support may be attached to further components of a system in which the positioning apparatus is used. According to the invention, the support portion supports the carrier. The support according to the present invention, preferably, does not include direct physical contact of the carrier and the support or at least no direct physical contact between the carrier and a main body of the support.

The connecting means for connecting the carrier and the support portion are such that the required movement of the carrier, in particular the tilting of the carrier with respect to the support portion can be performed.

The actuating means for creating forces to influence the relative position of the carrier to the support portion may in particular determine the angle of tilt and/or the distance of the carrier to the support portion.

According to the invention at least one bearing is provided for tilting movement of the carrier relative to the fixed portion, wherein repelling forces are provided by the bearing for repelling the movable carrier from the fixed support portion. The bearing according to the invention is made of at least two parts, wherein the physical contact of the two parts is hindered. In addition, the shape of the two parts of the bearing is such that a relative movement of one part of the bearing to the other part of the bearing may be performed without the two parts coming into contact. In particular, a tilting of one part of the bearing in the other part up to a certain tilt angle will be possible without physical contact. In addition, repelling forces are provided according to the present invention by the bearing for repelling the movable carrier from the fixed support portion. The repelling forces preferably act between two bearing parts where one part is partially inserted into the other.

Finally, at least one retention device for applying tension force between the carrier and the support portion is provided. The retention device which will also be referred to as retaining device, thus applies a force which counteracts against the repelling force of the bearing. Thereby, a resulting force between the support and the carrier may be adjusted to provide a desired distance between the support and the carrier, as will be described later in detail. The retaining device may be a spring, such as a helical spring or any other flexible element for applying tension.

With the apparatus according to the present invention, it will thus be possible to adjust the relative position of the carrier and thus the position of the optical element in a fast and reliable fashion. The counteracting forces within the apparatus, in particular the tension force and the repelling force may be adjusted. For example, the adjustment may be made by selection of material and/or size and/or shape of the respective devices which apply the forces. As adjustable counteracting forces are present between the support portion and the carrier, the distance between these two components may be adjusted to allow for movement, in particular tilting of the carrier without frictional force. Such a movement or tilting thus provides high performance of the apparatus as a change in position may be effected fast and with low energy consumption. High performance is in particular important in applications of laser beam deflection.

The first bearing magnet, which will also be referred to as the ball magnet, is shaped such that at least a part of the surface thereof has the shape of a partial sphere, in particular an outer sphere. The first bearing magnet may be a solid partial sphere. Preferably, the first bearing magnet, however, has the shape of a bowl, wherein at least part of the outer surface acts as the bearing surface. One advantage of such a shape is the lower weight of the magnet thereby contributing to a lower momentum of inertia of the positioning apparatus. The weight of the magnet may further be reduced by providing slots or holes in the first bearing magnet.

The second bearing magnet, which will also be referred to as a cup magnet, is shaped such that at least part of the surface thereof has the shape of a partial hollow sphere for at least partially receiving the partial sphere surface of the first bearing magnet. The partial hollow sphere may be formed by a cavity or recess in a solid block. Alternatively, the second bearing magnet may have the shape of a bowl with a constant wall thickness, wherein at least part of the inner surface acts as the bearing surface.

The bearing surfaces of the first and second bearing magnets will not be in physical contact with one another. The bearing surfaces of the magnets, hence, denote the surfaces of the magnets, where the distance between the two magnets is minimal. The distance between the two bearing surfaces will also be referred to as an air gap.

The shapes of the bearing surface of the first and second bearing magnet preferably correspond to each other. That means that the distance between the two bearing surfaces is equal over the surface area of the bearing surfaces. Thereby, a contact between the two magnets upon movement, in particular tilting of one of the magnets can be avoided. In addition, a tilting of the carrier about one single point, that means not limited to a specific axis within the surface of the carrier, can be performed.

The air gap between the two bearing magnets, in particular between the bearing surfaces of the magnets is caused by the design and arrangement of the magnets. According to the present invention, the magnets are arranged such that the opposing magnet poles of the first and second bearing magnet face each other. Thereby, repelling forces between the two magnets are present and the air gap can be generated and is maintained. Preferably, the bearing surfaces of the bearing magnets act as the poles of the magnets. Thereby the repelling force between the two magnets can be maximized.

According to the present invention, the first and second bearing magnets are permanent magnets. This selection of magnets is advantageous over the usage of electromagnetic bearing magnets, as the layout and operation of the bearing is facilitated. In particular, no current is necessary for generating the magnetic repelling forces. In addition, the apparatus can be designed in a compact format as no electric current supply and no coils for generating an electromagnetic between the bearing magnets have to be provided.

According to a preferred embodiment, the actuating means of the positioning apparatus are separate from the bearing. In this context separate means spaced from the location of the bearing and being provided as a separate unit or as separate elements. In a preferred embodiment, in a perpendicular top view of the carrier, the bearing is located in the centre of the carrier and the actuating means are located outside of the centre, in particular towards the edge of the carrier. By providing the actuating means at such a location, the forces generated by the actuating means for changing the position of the carrier can be lower as the distance to the centre will act as a lever arm. In addition, an interaction of the forces generated by the bearing and the actuating means can be avoided with the spaced positioning of these components. By providing the actuating means as separate units or elements to the bearing, it is also possible to independently select the material, shape and layout of the bearing and the actuating means according to their desired function.

The first bearing magnet may be integrally formed with the carrier and the second bearing magnet may be integrally formed with the support portion. In a preferred embodiment, however, at least the first bearing magnet is a separate unit to the carrier and is attached thereto. The first bearing magnet is in particular attached to the bottom of the carrier, that means to the side of the carrier which is opposed to the side of the carrier where the optical element or the reflective surface of the optical element is provided.

Also the second bearing magnet may be a separate unit to the support portion and may be attached thereto.

By providing the first and second bearing magnets as units which are separate to the carrier and support portion, respectively, the material and layout of the carrier and support portion may be selected according to their function. In particular, the carrier may be designed as comprising a printed circuit board. The first bearing magnet or ball magnet may be designed such that its weight is reduced to a minimum. This may be done by providing slots or holes in the first bearing magnet. The reduction of weight of this first bearing magnet is beneficial as it will be attached to the carrier, which is to be moved, in particular tilted, within the apparatus.

According to a preferred embodiment, the actuating means comprise means for creating an electromagnetic flux for influencing the relative position of the carrier to the support portion. By selecting this type of actuating means, the change of position may be effected by mere supply of current. In addition, this type of actuating means is very responsive, so that a change of position may be effected fast and accurately.

Coils for creating a magnetic field may be provided on or in the carrier and/or on or in the support portion. These coils can act together with respective magnets provided on the other component, i.e. the support portion and/or the carrier. In one embodiment, the carrier could for example be a magnet interacting with coils provided on or in the support portion.

In a preferred embodiment, the actuating means comprise at least one coil in or on the carrier and at least one actuating magnet in or on the support portion. Preferably, at least two and further preferably, at least four coils and four actuating magnets are provided. The coils may be arranged on the edge or corner areas of a square or rectangular carrier. By providing the coils in these locations and arranging the actuating magnets accordingly, a tilting of the carrier with respect to the support portion may be carried out about at least two axes, which will be described again later in detail.

Preferably, the carrier comprises at least one printed circuit board. By using at least one printed circuit board in the carrier, coils for the actuating means can reliably be positioned. In addition, the weight of the carrier is minimized in this embodiment. The carrier may consist of a printed circuit board. It is, however, also possible that the carrier consists of more than one printed circuit board which are then stacked on top of one another. Finally, it is also possible to use one printed circuit board which is embedded in an embedding material as a carrier.

If coils and actuating magnets are provided as actuating means, the actuating magnet is preferably arranged to pass through the coil of the carrier. The magnet preferably at least temporarily passes through the coil of the carrier. This arrangement is advantageous, as the distance between the coil and the magnet can be kept at a minimum and thus the current for actuating, in particular tilting the carrier is low. If the magnets were to be arranged underneath the respective coils, the distance between each of the magnets and their respective coil would increase with any tilting movement of the carrier. Furthermore, the embodiment where the magnets are arranged to pass through the coils has the advantage that it is possible to reflect into a conical or near-conical space from a single or near single rotation point on the optical element on the carrier without being limited by specific linear axes.

Preferably, at least one coil is arranged in an edge area of the carrier spaced from the optical element. It is particularly preferred to arrange the coils at the corner areas of a square or rectangular carrier. The arrangement of the coils spaced from the optical element is advantageous as magnets corresponding to the coils may be passed through the coils without being hindered by the optical element. In addition, the distance between the optical element and the coil also prevents casting of a shadow of a magnet passing through the coil onto the optical element. Hence, the path of a beam or laser beam which is to be deflected by the apparatus, is not interrupted by the magnet.

According to a preferred embodiment, the apparatus comprises a position detector. By including the position detector in the apparatus, alignment of the detector with the other components of the apparatus does not have to be performed by the user.

Preferably, the position detector comprises at least one emitting unit and at least one sensing unit. However, also other types of position detectors such as capacitive detectors may be used.

If a position detector comprising an emitting unit and a sensing unit is used, it is preferred that the emitting unit is arranged on or in the carrier or on or in one of the bearing magnets and in that the sensor unit is arranged on or in or under the support portion or on or in or under one of the bearing magnets.

Preferably the optical element, which is held by the carrier, has at least one reflective surface. The optical element may for example be a mirror. The reflective surface is facing away from the carrier, so that a beam reaching the optical element may be reflected by the optical element.

Preferably, the centre of the surface of the optical element facing away from the carrier is at a single point regardless of the relative position of the carrier to the support portion. Thereby an accurate deflection of the beam or laser beam can be achieved without necessitating an adjustment of the distance of the optical element to the fixed support. Keeping the centre of the optical element at a single point is possible with the inventive apparatus as the bearing allows for pivoting of the carrier without increasing the distance of the centre of the optical element from the fixed support portion.

The apparatus according to the present invention is preferably a laser beam deflection apparatus. With laser beams the advantages of the present invention, in particular the high performance and compact layout can be used efficiently as the fast and accurate deflection of laser beams also at locations of limited space are mandatory.

According to a further aspect, the present invention relates to a system for directing a beam, in particular a laser beam, wherein the system is characterized in that it comprises at least one positioning apparatus according to the invention and at least one laser source. With such a system laser scanning and other laser methods may be carried out with high performance.

Features and advantages which are described with respect to the inventive positioning apparatus also apply to the inventive system and vice versa.

BRIEF DESCRIPTION OF THE DRAWINGS

The invention will hereinafter be described again with reference to the enclosed figures, wherein.

The invention is not limited to the embodiment shown in the Figures. Individual features shown in the Figures may be used in a different embodiment without necessitating the use of all features of the depicted embodiment in the different embodiment.

DETAILED DESCRIPTION OF THE PREFERRED EMBODIMENT

Figure 1:
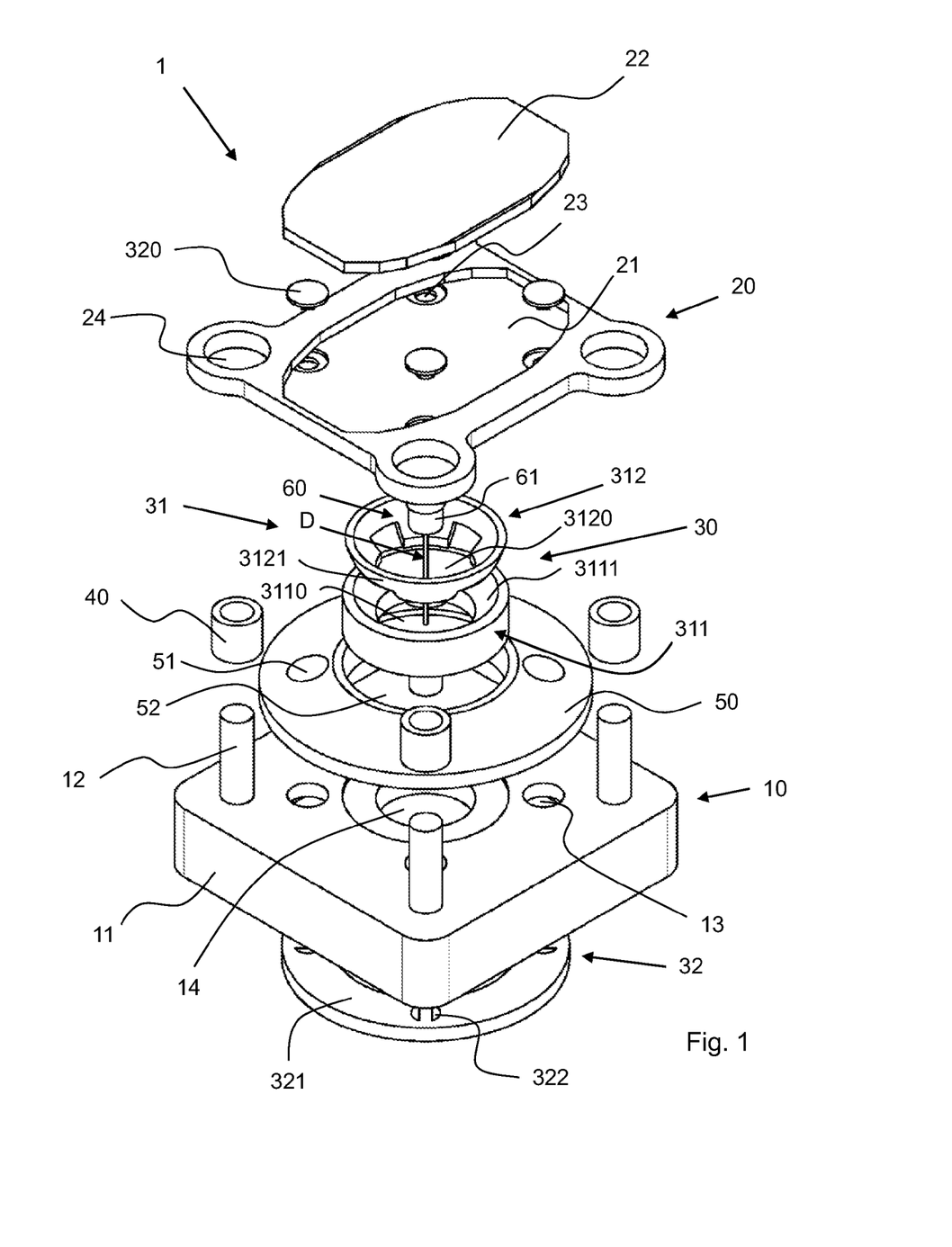
FIG. 1 shows a perspective, exploded view of an embodiment of the positioning apparatus.

The embodiment of the positioning apparatus 1 according to FIG. 1 comprises a support portion 10, a carrier 20 as well as connecting means 30.

The support portion 10 has a main body 11 in the shape of a thick plate. On the upper side of the main body 11, four posts 12 are arranged, which are directed perpendicular from the upper side of the main body 11. Furthermore, the support portion 10 has a central opening 14 and four passage ways 13 arranged between the central opening 14 and the posts 12.

The carrier 20 has the shape of the thin plate with an upper and a lower surface. The lower surface is facing towards the support portion 10. In the upper surface a recess 21 is provided for receiving an optical element 22.

The shape of the recess 21, hence, corresponds to the shape of the optical element 22. In the depicted embodiment the optical element 22 and the recess 21 have the shape of an elongated rectangle with rounded corners. The optical element 22 is planar, has an upper reflecting surface and will hereinafter also be referred to as a mirror. The thickness of the optical element 22 corresponds to or is slightly larger than the depth of the recess 21. In the recess 21 four passage ways 23 are provided. In each corner area of the carrier 20 a coil hole 24 is provided which extends through the thickness of the carrier. In the thickness of the carrier 20 at least one coil (not shown) is provided. The coils are preferably connected and at least one coil encircles a coil hole 24. The coils may be provided on so called printed circuit boards and the carrier 20 may consist of one or more of such printed circuit boards stacked on top of each other.

The connecting means 30 according to the depicted embodiment comprises a bearing 31 and retention means 32. The bearing 31 consists of a first bearing magnet 312 and a second bearing magnet 311. In the depicted embodiment, the second bearing magnet 311 is the lower bearing part and the first bearing magnet 312 is the upper bearing part.

The second bearing magnet 311, which may also be referred to as a cup magnet, is connected to the support portion 10. On top of the support portion 10 a bumper 50, which has the shape of a conical ring is provided. In the bumper 50 a central opening 52 and passage ways 51 are provided. The second bearing magnet 311 has a cylindrical outer side. In the centre of the second bearing magnet 311 a central opening 3110 is provided. From the circumference of the second bearing magnet 311 to the central opening 3110 an inner bearing surface 3111 is provided, which has the shape of a partial hollow sphere.

The first bearing magnet 312, which may also be referred to as a ball magnet, is connected or attached to the lower surface of the carrier 20. The first bearing magnet 312 also has a central opening 3120. The outside of the first bearing magnet 312, which may also be referred to as its bottom side, has the shape of a partial sphere. The wall thickness of the first bearing magnet 312 is constant over its height. Hence, the upper side or inner side of the first bearing magnet 312 has the shape of a partial hollow sphere. At the bottom of the first bearing magnet 312 slots are provided in the wall. These slots serve for reducing the weight of the first bearing magnet 312.

The retention device 32 of the embodiment shown in FIG. 1 comprises a base plate 321 which may be in the shape of a ring. On the top of the base plate 321 lower anchors 322 are provided. In addition, upper anchors 320 are provided as part of the retention device 32. These upper anchors 320 are provided at the carrier 20 and face downward through the passage ways 23 in the recess 21 of the carrier 20. The upper anchors 320 and the lower anchors 321 are connected by retaining devices (not shown) which may be in the shape of a helical spring. The retaining devices extend from the upper anchors 320 through the passage ways 51 in the bumper 50 and the passage ways 13 in the main body 11 of the support portion to the lower anchors 322.

The positioning apparatus 1 further comprises actuating means. In the depicted embodiment, the means comprise actuating magnets 40, which will also be referred to as magnets, attached to the posts 12 of the support portion 10 and coils (not shown) in the carrier 20. The actuating magnets 40 are positioned at the top of the posts 12 which, in the mounted condition of the positioning apparatus 1, extend through the coil holes 24 of the carrier 20. The magnets 40, hence, have a tubular or pipe shape.

Finally, the positioning apparatus 1 further comprises a position detector 60. In FIG. 1 only an emitting device 61 as part of the position detector 60 is shown. The position detector 60 in this embodiment, however, further comprises a position sensor (not shown), which detects a detection beam D emitted by the emitting device 61. The sensor beam may be a laser beam, but is different from the beam which reaches the optical element 22 and which may be deflected by the positioning apparatus 1. The position sensor may be arranged in the bottom part of the central opening 14 of the support portion 10 or underneath said central opening 14. The emitting device 61 is ideally mounted into the printed circuit board of the carrier 20 or is at least attached to the carrier 20 so that the detection beam D, which may also be referred to as a sensing beam or sensing laser beam, emitted from the emitting device 61 passes over the position sensor or sensing device (not shown) mounted under or in or on the support portion 10 to then sense the precise tilt of the carrier 20. In an alternative embodiment, said sensing or detection beam or sensing or detection laser beam D that is not said beam or laser beam being deflected by said optical element 22 of the apparatus 1 is emitted from an emitting device (not shown) mounted under or in or on the support portion 10 towards a reflective component (not shown) or a sensing device (not shown) mounted at the bottom of or under the carrier 20. In either case, the detection beam D passing over the respective position sensor (not shown) and provides positional signals of the precise tilt of the carrier 20. This signal may be used to control the current to be applied to coils within the carrier 20 for tilting the carrier 20 as will be described in more detail hereinafter.

The operation of the positioning apparatus will now be described in more detail with reference to FIGS. 2 to 7.

Figure 2:
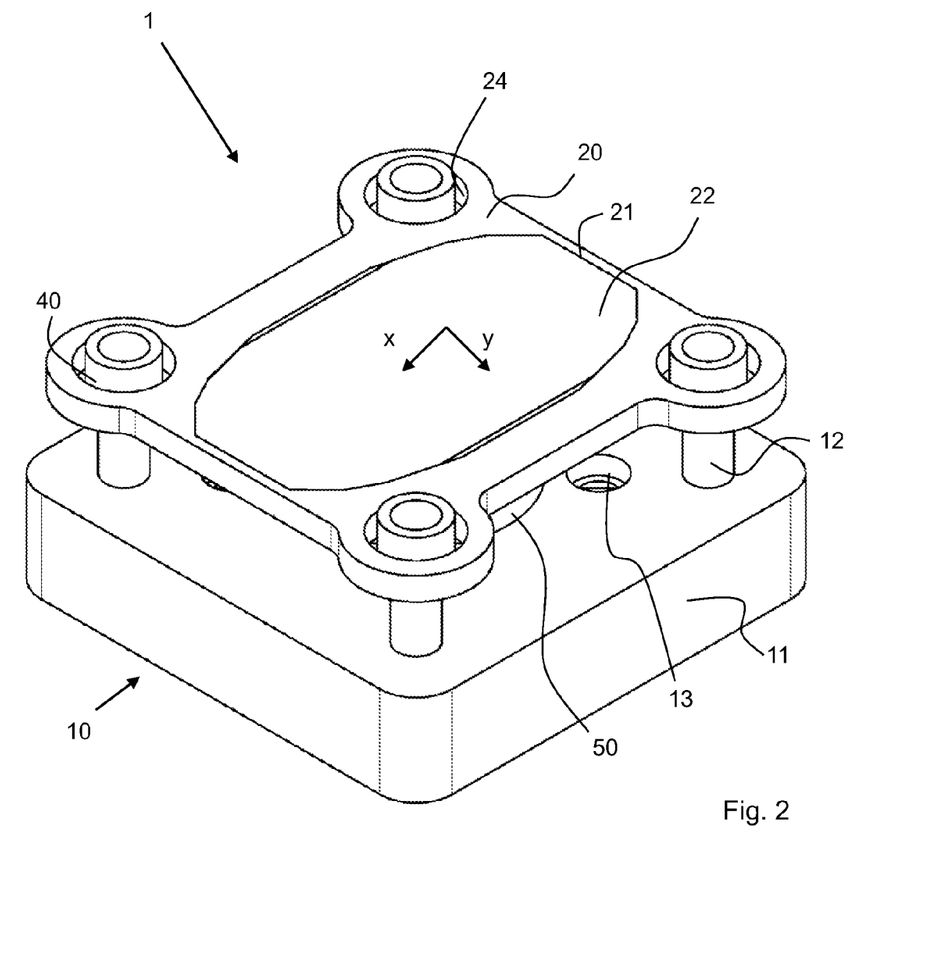
FIG. 2 shows a perspective view of the embodiment of the positioning apparatus according to FIG. 1 in a first position.
Figure 3:
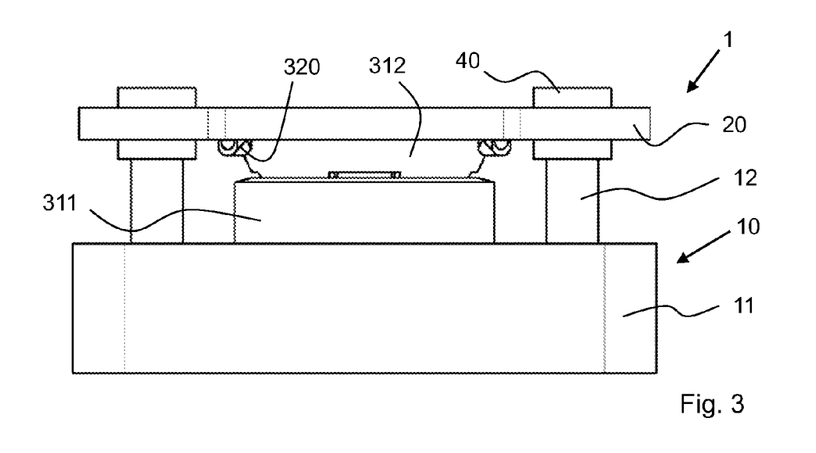
FIG. 3 shows a side view of the embodiment of the positioning apparatus according to FIG. 1 in the first position.
Figure 4:
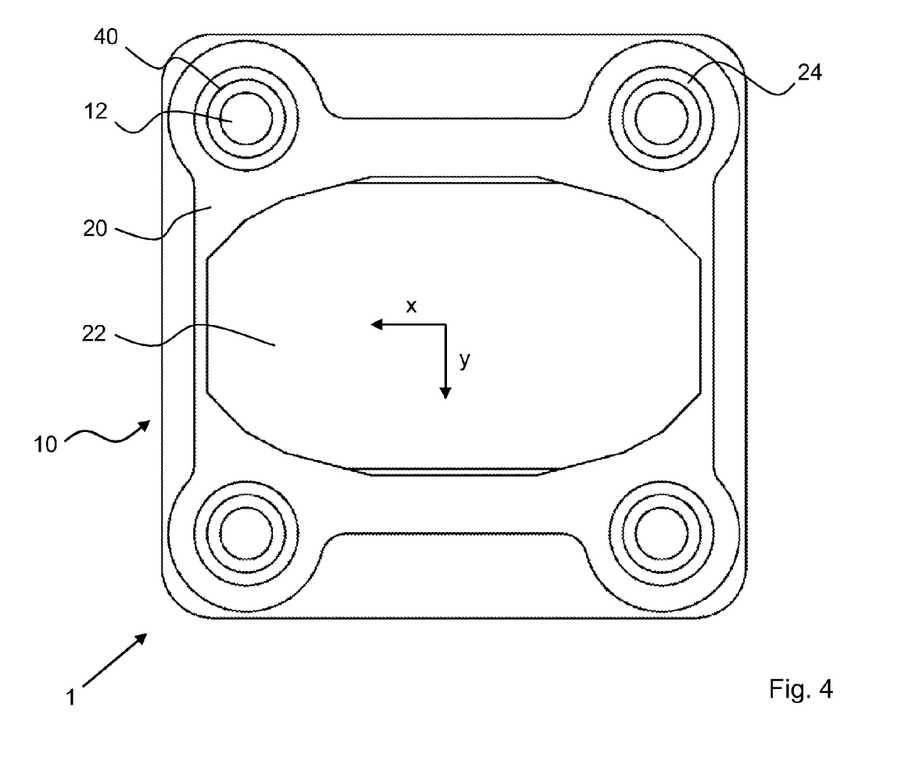
FIG. 4 shows a top view of the embodiment of the positioning apparatus according to FIG. 1 in the first position.

FIGS. 2, 3 and 4 show the positioning apparatus 1 in the assembled or mounted condition in different views. In this condition, the magnets 40 are positioned in the upper part of the posts 12 and extend through the coil holes 24 of the carrier. The optical element 22 is received and possibly attached to the recess 21 in the carrier 20. The first bearing magnet 312 is attached to the bottom surface of the carrier 20 and the bearing surface 3121 of the first bearing magnet 312 is received in the bearing surface 3111 of the second bearing magnet 311. The poles of the first and second bearing magnets 311, 312 are opposed to each other in this arrangement. Hence, the inner bearing surface 3111 and the outer bearing surface 3121 repel each other, thereby creating an air gap between the two bearing surfaces 3111, 3121. The retaining devices (not shown) between the upper and the lower anchors 322, 320 of the retention device 32 apply tension forces between the carrier 20 and the support portion 10. These tension forces are opposed to the repelling forces acting between the two bearing magnets 311 and 312.

The carrier 20, which may also be referred to as a tilting apparatus, comprises the optical element 22, which may be a mirror, and a printed circuit board may included in or may form the carrier 20. The carrier 20 floats on the natural magnetic cushion created by the opposing magnetic poles from the partial sphere or "ball" magnet 312 mounted to the underside of the carrier 20 and the matching hollowed sphere or "cup" magnet 311 mounted to the support portion 10, which may also be referred to as the base.

In order to prevent the opposing magnet poles of the partial sphere or "ball" magnet 312 and the matching hollowed sphere or "cup" magnet 311 from forcing the carrier 20 or tilting apparatus comprising the optical element 22 and printed circuit board of the carrier 20 from moving away from the support portion 10, flexible retention devices (not shown) are fixed between the upper retainer anchors 320 and lower retaining anchor/s 322.

The upper retaining anchors 320 are mounted into or onto the carrier 20, in particular into or onto a printed circuit board forming the carrier 20, underneath the optical element 22. The lower retaining anchor/s 322 are mounted under or in or on the support portion 10 so that the flexible retention devices (not shown) are continually stressed and said stress will loosen and tighten with the tilting of the carrier 20 floating on said natural magnetic cushion in this embodiment created by said opposing magnetic poles from said partial sphere or "ball" magnet 312 mounted to the underside of said carrier 20 or printed circuit board and said matching hollowed sphere or "cup" magnet 311 mounted on said support portion 10.

Electrical current may be passed through the coils (not shown) provided in the carrier 20, in particular printed into a printed circuit board forming or being included in the carrier 20. Thereby, the electrical current in the coils which surround the fixed magnets 40 on the posts 12 generates a magnetic field. By varying the current force and direction in each of said coils said carrier 20 can be tilted in all directions to steer a beam or laser beam, which impinges on the optical element 22 in the carrier 20.

In the optimum embodiment, the apparatus 1 comprising the optical element 22 and a printed circuit board in a carrier 20 floating on the magnetic cushion created by the opposing magnetic poles from the partial sphere or "ball" magnet 312 and the matching hollowed sphere or "cup" magnet 311 is able to tilt in all directions while the centre of the optical element 22 or mirror is kept at a single point.

In an alternative embodiment the magnetic cushion created by the opposing magnetic poles from the partial sphere or "ball" magnet 312 and the matching hollowed sphere or "cup" magnet 311 may be inverted so that the hollowed sphere or "cup" magnet 311 is mounted to the underside of the carrier 20 and a matching partial sphere or "ball" magnet 312 is mounted to the support portion 10.

FIG. 2 depicts an isometric view of the positioning apparatus 1 in a position of equilibrium with equal tension applied to the flexible retention devices (not shown) and equal electrical current being passed through said coils (not shown) printed into the printed circuit board in the carrier 20. Thereby, the electrical current in said coils surrounding said fixed magnets 40 generate equal magnetic fields to hold the carrier 20 comprising the optical element 22 parallel or near to parallel to the support portion 10. A beam or laser beam (not shown) may be directed towards the optical element 22. The incoming beam or laser beam is then in this embodiment ideally arriving at a 45 degree angle to the reflecting surface of the optical element 22 and the deflected beam or laser beam then leaves the reflecting surface of the optical element 22 at a 45 degree angle and 90 degrees from the incoming beam or laser beam.

Figure 5:
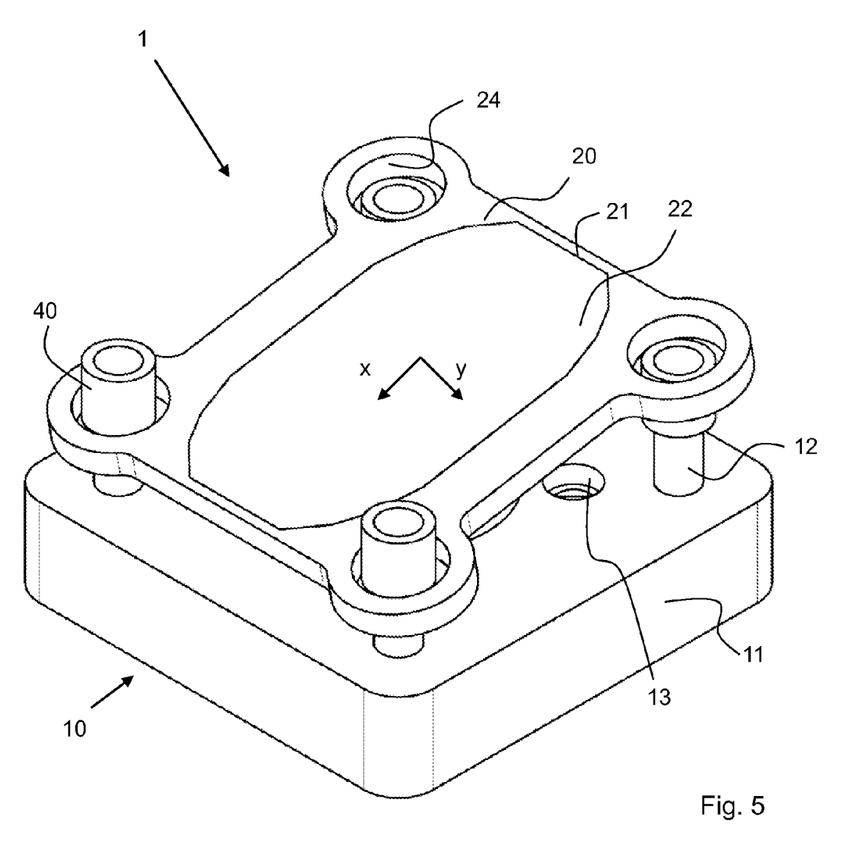
FIG. 5 shows a perspective view of the embodiment of the positioning apparatus according to FIG. 1 in a second position.

FIG. 5 depicts an isometric view of the positioning apparatus 1 with the carrier 20 tilted only forwards. The direction of tilt in this Figure will be referred to as the x-axis or as a tilt about the y-axis. The x-axis coincides with the axis of an incoming beam or laser beam directed towards the optical element 22. The carrier 20 is thus tilted in the same axis as the incoming beam. This tilt is effected by applying equal electrical current through the two coils (not shown)—in this embodiment printed into a printed circuit board (not shown)—on the beam or laser beam exit side of the carrier 20. These two coils in the depicted embodiment are the coils surrounding the two front coil holes 24 in FIG. 5. Equal electrical current in the opposite direction is passed through the two coils (not shown) in this embodiment printed into a printed circuit board (not shown) on the beam or laser beam entry side of the carrier 20. These two coils in the depicted embodiment are the coils surrounding the two back coil holes 24 in FIG. 5. The incoming beam or laser beam is in this embodiment ideally arriving at a 45 degree angle to the optical element 22 and the deflected beam or laser beam then leaves said optical element 22 at a 45 degree plus double the mechanical tilt angle of the carrier 20 of the apparatus 1.

Figure 6:
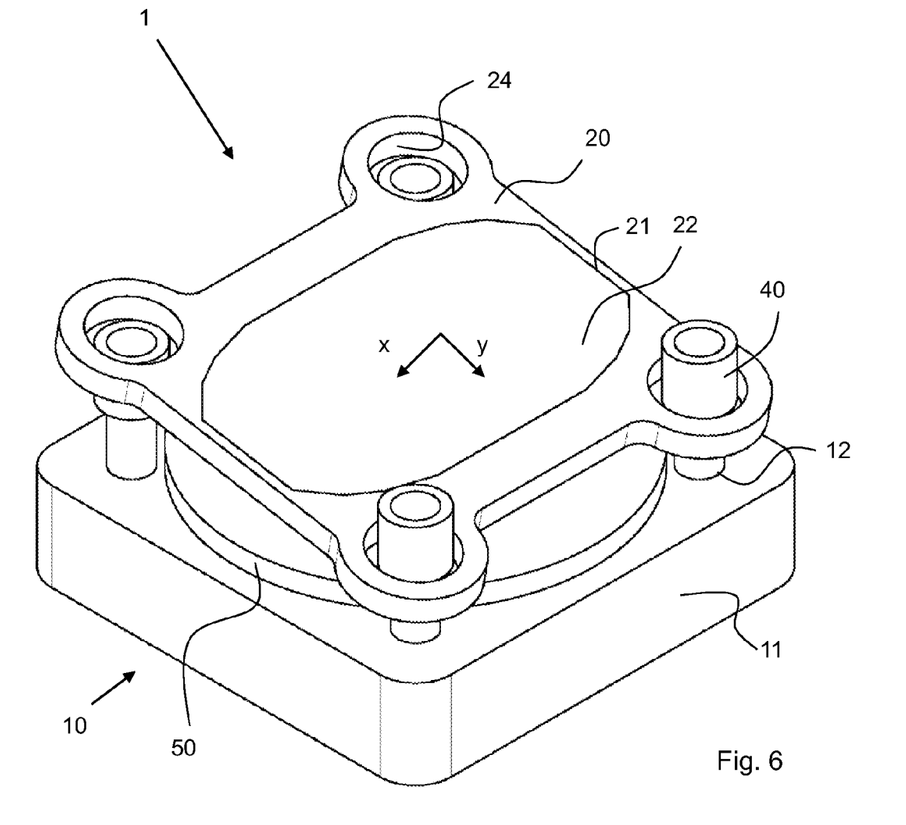
FIG. 6 shows a perspective view of the embodiment of the positioning apparatus according to FIG. 1 in a third position.

FIG. 6 depicts an isometric view of the apparatus 1 with the carrier 20 tilted only sideways in the cross axis to the incoming beam, which will also be referred to as the y-axis. The tilt may also be referred to as a tilt about the x-axis. This tilt is effected by applying equal electrical current through the two coils (not shown)—in this embodiment printed into a printed circuit board (not shown)—on one side of the entry path of the beam or laser beam at the carrier 20. These two coils in the depicted embodiment are the coils surrounding the two left side coil holes 24 in FIG. 6. Equal electrical current in the opposite direction is passed through the two coils (not shown) in this embodiment printed into a printed circuit board (not shown) on the opposite side and parallel with the entry path of the beam or laser beam at the carrier 20. These two coils in the depicted embodiment are the coils surrounding the two right side coil holes 24 in FIG. 6. The incoming beam or laser beam is in this embodiment ideally arriving at a 45 degree angle to the optical element 22 and the deflected beam or laser beam then leaves the optical element 22 at a compound angle comprising the cross axis angle of the carrier 20 of the apparatus 1.

Figure 7:
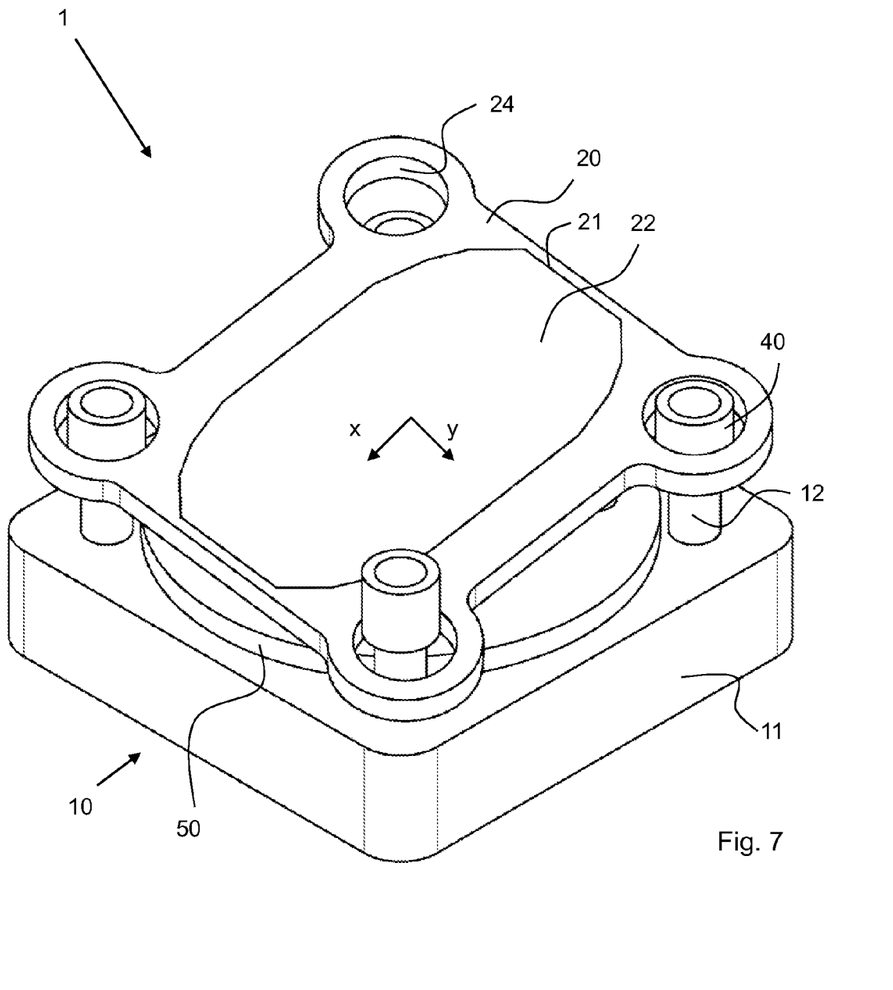
FIG. 7 shows a perspective view of the embodiment of the positioning apparatus according to FIG. 1 in a fourth position.

FIG. 7 depicts an isometric view of the apparatus 1 with the carrier 20 tilted in the direction of both the x-axis and the y-axis. Hence, the carrier 20 is tilted in both the axis as the incoming beam and in the cross axis. This tilt is effected by applying electrical current through the coil (not shown)—in this embodiment printed into a printed circuit board (not shown)—on the front right hand side which surrounds the front right hand side coil hole 24 of the carrier 20. Opposite direction electrical current is applied to the back left hand side coil which surrounds the back left hand side coil hole 24 in the carrier 20. The incoming beam or laser beam is in this embodiment ideally arriving at a 45 degree angle to said optical element 22 at a compound 45 degree plus double the mechanical tilt angle of the carrier 20 of the apparatus 1 in the first axis (x-axis) parallel to the incoming entry beam or laser beam and an angle corresponding to the tilt angle of said carrier 20 in the second axis (y-axis) perpendicular to the incoming entry beam or laser beam.

As shown in the depicted embodiment, a compact positioning apparatus 1, which may also be referred to as a beam deflection motor, comprises an optical element 22, such as a mirror, mounted onto or into a carrier 20, which may be formed by or includes a printed circuit board (not shown). The optical element 22 serves for the purpose of deflecting and steering a beam or laser beam (not shown). For this deflection or steering electrical current is passed through coils (not shown) printed into a printed circuit board of the carrier 20 or otherwise provided in the carrier 20. The coils surround fixed magnets 40 and by varying the current in each of the coils, the carrier 20 and the optical element 22 can thus be tilted in all directions to steer said beam or laser beam.

Advantages of the inventive arrangement are that it is a very compact method of high-speed beam or laser beam deflection by beam or laser beam entry aperture size. Furthermore, the apparatus requires only a single mirror and it requires no coil windings as the coil is included into the carrier, preferably printed into a printed circuit board in the carrier. In addition, the electrical current the apparatus needs to draw to provide the same level of deflection angle at the same speed as a traditional single-axis rotary galvano motor is greatly reduced. The "ball" and "cup" opposing polarity magnet bearing maintains the centre of the optical element, in particular the mirror, at or near a single point and because there is no physical contact between the bearing parts, it provides no resonance or wear. The apparatus is far simpler to assemble in production and post-factory calibration; in montage into beam or laser beam delivery systems it requires no additional alignment, tuning and/or calibration.

REFERENCE LIST

1 Positioning apparatus
10 Support portion
11 Main body
12 Post
13 Passage way
14 Central opening
20 Carrier
21 Recess
22 Optical element
23 Passage way
24 Coil hole
30 Connecting means
31 Bearing
311 second magnet (hollow sphere or cup)
3110 central opening
3111 inner bearing surface
312 first magnet (hollow sphere or ball)
3120 central opening
3121 outer bearing surface
32 Retention device
320 Upper Anchor
321 Base plate
322 Lower anchor
40 Actuating magnet
50 Bumper
51 Passage way
52 central opening
60 Position detector
61 Emitting device
D Detection beam

What is claimed is:

1. Apparatus for positioning at least one optical element, wherein the apparatus comprises:
at least one movable carrier for holding the optical element;
at least one fixed support portion for supporting the carrier;
connecting unit connecting the carrier and the support portion; and
actuating unit creating forces to influence the relative position of the carrier to the support portion;
characterized in that the connecting unit comprise:
at least one retention device for applying tension force between the carrier and the support portion; and
at least one bearing, wherein the bearing comprises:
a first bearing magnet, wherein at least a part of the surface of the first bearing magnet has the shape of a partial sphere; and
a second bearing magnet, wherein at least part of the surface of the second bearing magnet has the shape of a partial hollow sphere for at least partially receiving the partial sphere surface of the first bearing magnet;
wherein the first and second bearing magnets are permanent magnets and are arranged such that the opposing magnet poles of the first and second bearing magnet are facing each other, and
wherein the first bearing magnet is attached to or is integrally formed with the carrier and the second bearing magnet is attached to or is integrally formed with the support portion.

2. Apparatus according to claim 1, characterized in that the actuating unit are separate from the bearing.

3. Apparatus according to claim 1, characterized in that the actuating unit creating an electromagnetic flux for influencing the relative position of the carrier to the support portion.

4. Apparatus according to claim 3, characterized in that the actuating unit comprise at least one coil in or on the carrier and at least one actuating magnet in or on the support portion.

5. Apparatus according to claim 4, characterized in that the actuating magnet is arranged to pass through the coil of the carrier.

6. Apparatus according to claim 5, characterized in that the at least one coil is arranged in an edge area of the carrier spaced from the optical element.

7. Apparatus according to claim 4, characterized in that the at least one coil is arranged in an edge area of the carrier spaced from the optical element.

8. Apparatus according to claim 1, characterized in that the carrier comprises at least one printed circuit board.

9. Apparatus according to claim 1, characterized in that the apparatus comprises a position detector.

10. Apparatus according to claim 9, characterized in that the position detector comprises at least one emitting unit and at least one sensing unit.

11. Apparatus according to claim 10, characterized in that the emitting unit is arranged on or in the carrier or on or in one of the bearing magnets and in that the sensor unit is arranged on or in the support portion or on or in one of the bearing magnets.

12. Apparatus according to claim 1, characterized in that the optical element has at least one reflective surface.

13. Apparatus according to claim 1, characterized in that the centre of the surface of the optical element facing away from the carrier is at a single point regardless of the relative position of the carrier to the support portion.

14. Apparatus according to claim 1, characterized in that the apparatus is a laser beam deflection apparatus.

15. System for directing a beam, in particular a laser beam, characterized in that the system comprises at least one positioning apparatus according to claim 1 and at least one laser source.

* * * * *